(12) United States Patent
Sinde

(10) Patent No.: US 7,620,611 B1
(45) Date of Patent: Nov. 17, 2009

(54) NEURAL NETWORKS FOR INGRESS MONITORING

(75) Inventor: Gary W. Sinde, Indianapolis, IN (US)

(73) Assignee: Trilithic, Inc., Indianapolis, IN (US)

( * ) Notice: Subject to any disclaimer, the term of this patent is extended or adjusted under 35 U.S.C. 154(b) by 2203 days.

(21) Appl. No.: 09/618,615

(22) Filed: Jul. 18, 2000

Related U.S. Application Data

(60) Provisional application No. 60/144,678, filed on Jul. 20, 1999.

(51) Int. Cl.
G06F 15/18 (2006.01)

(52) U.S. Cl. ........................................................ 706/15

(58) Field of Classification Search ................. None
See application file for complete search history.

(56) References Cited

U.S. PATENT DOCUMENTS

| | | | | |
|---|---|---|---|---|
| 3,936,449 A | * | 2/1976 | Matuo et al. ................. | 544/142 |
| 4,481,191 A | * | 11/1984 | Wei et al. ........................ | 514/14 |
| 5,251,626 A | * | 10/1993 | Nickolls et al. ................ | 607/14 |
| 5,461,066 A | * | 10/1995 | Gericke et al. ................ | 514/329 |
| 5,578,061 A | * | 11/1996 | Stroetmann et al. ............ | 607/4 |
| 5,625,749 A | | 4/1997 | Goldenthal et al. | |

(Continued)

FOREIGN PATENT DOCUMENTS

EP  0 748 120 A1  12/1996

OTHER PUBLICATIONS

MedicineNet.com definition of "QRS complex", obtained at http://www.medterms.com/script/main/art.asp?articlekey=5160, Oct. 15, 2004.*

(Continued)

*Primary Examiner*—Donald L Champagne
(74) *Attorney, Agent, or Firm*—Barnes & Thornburg LLP (57) ABSTRACT

A method of identifying a source of ingress into a network includes storing frequency spectra of known sources of ingress, comparing the frequency spectrum of ingress to the frequency spectra of known sources of ingress, and determining from the comparison which of the frequency spectra of known sources of ingress is closest to the frequency spectrum of the ingress. Apparatus for identifying a source of ingress into a network includes memory for storing frequency spectra of known sources of ingress and a device for comparing the frequency spectrum of the ingress to frequency spectra of known sources of ingress and determining from the comparison which frequency spectrum of a known source of ingress is closest to the frequency spectrum of the ingress. A method of establishing ingress into a network includes developing a first frequency spectrum indicative of the condition of the network at a first time during the operation of the network, developing a second frequency spectrum indicative of the condition of the network at a second, later time, comparing the second frequency spectrum to the first frequency spectrum, and determining from the comparison a condition of the network at the second time. Apparatus for establishing ingress into a network includes a device for receiving frequency spectra. The device receives at least one first frequency spectrum indicative of the condition of the network at a first time during the operation of the network, and a second frequency spectrum indicative of the condition of the network at a second, later time. The device compares the second frequency spectrum to the first frequency spectrum and determines from the comparison the condition of the network at the second time.

40 Claims, 6 Drawing Sheets

U.S. PATENT DOCUMENTS

| | | | |
|---|---|---|---|
| 5,742,591 A | | 4/1998 | Himayat et al. |
| 5,841,651 A | | 11/1998 | Fu |
| 5,865,756 A | * | 2/1999 | Peel, III ............... 600/490 |
| 5,881,363 A | | 3/1999 | Ghosh et al. |
| 6,414,030 B1 | * | 7/2002 | Wirth et al. ............ 514/585 |
| 6,516,309 B1 | * | 2/2003 | Eberhart et al. ........ 706/27 |
| 2004/0230252 A1 | * | 11/2004 | Kullok et al. ............ 607/48 |

OTHER PUBLICATIONS

Tortora, Gerard J., et al., "Principles of Anatomy and Physiology", 7th ed. (NY, NY: HarperCollins, 1993): 601-603.*

Martini, Frederic, et al., "Fundamentals of Anatomy and Physiology", 7th ed. (San Francisco CA: Benjamin Cummings, 2006): 684-687.*

* cited by examiner

NEURAL NETWORKS FOR INGRESS MONITORING

CROSS-REFERENCE TO RELATED APPLICATIONS

This is a regular utility patent application claiming priority to U.S. provisional patent application Ser. No. 60/144,678 filed Jul. 20, 1999, the disclosure of which is incorporated herein by reference.

FIELD OF THE INVENTION

This invention relates the investigation of noise in networks. More specifically, the invention relates to the identification of the sources of ingress noise into networks. It is disclosed in the context of the investigation of noise in community antenna television (CATV), or "cable," systems, but is believed to be useful in other applications as well.

BACKGROUND OF THE INVENTION

From the beginning of cable television service in the early 1950's until fairly recently, the predominant direction of information flow in cable systems has been from the headend to the subscriber. However, with the advent of pay-per-view and other cable services, it has become important to maintain the integrity of an upstream communication pathway from the subscriber to the headend to permit the ordering of services, and so on. The demand on the upstream communication pathway has continuously increased, with the addition of shopping, banking, Internet access, and other high-speed data communication services, including telephone services, being offered over the so-called "return path" to the headend. The bandwidth of the return path has been established in the 5 MHz to 42 MHz range. There are a number of sources of signal and noise in this frequency band other than return path communication sources. These other sources include, but are by no means limited to, amateur radio, citizens' band radio, machinery noise, home appliance noise, home computer clock signals, AM radio (which actually is slightly below the return path band, but nonetheless a trouble spot), and other electrical artifacts. It is often extremely difficult for the cable technician to determine where ingress into the cable system is coming from.

SUMMARY OF THE INVENTION

According to one aspect of the invention, a method of identifying a source of ingress into a network includes storing frequency spectra of known sources of ingress, comparing the frequency spectrum of ingress to the frequency spectra of known sources of ingress, and determining from the comparison which of the frequency spectra of known sources of ingress is closest to the frequency spectrum of the ingress.

Illustratively according to this aspect of the invention, comparing the frequency spectrum of the ingress to the frequency spectra of known sources of ingress and determining from the comparison which of the frequency spectra of known sources of ingress is closest to the frequency spectrum of the ingress together include finding an optimum solution to the problem of comparison of the frequency spectrum of the ingress to the frequency spectra of known sources of ingress.

Further illustratively according to this aspect of the invention, finding an optimum solution to the problem of comparison of the frequency spectrum of the ingress to the frequency spectra of known sources of ingress includes teaching a neural network the frequency spectra of known sources of ingress.

Illustratively, finding an optimum solution to the problem of comparison of the frequency spectrum of the ingress to the frequency spectra of known sources of ingress includes using a back propagation neural network to find an optimum solution to the problem of comparison of the frequency spectrum of the ingress to the frequency spectra of known sources of ingress.

Illustratively, teaching a neural network the frequency spectra of known sources of ingress and using a back propagation neural network to find an optimum solution to the problem of comparison of the frequency spectrum of the ingress to the frequency spectra of known sources of ingress together include using a particle swarm optimizer to find an optimum solution to the problem of comparison of the frequency spectrum of the ingress to the frequency spectra of known sources of ingress.

Illustratively according to this aspect of the invention, the method further includes digitizing the frequency spectrum of the ingress.

Further illustratively according to this aspect of the invention, comparing the thus-digitized frequency spectrum of the ingress to the frequency spectra of known sources of ingress and determining from the comparison which frequency spectrum of a known source of ingress is closest to the thus-digitized frequency spectrum of the ingress together include finding an optimum solution to the problem of comparison of the thus-digitized frequency spectrum of the ingress to the frequency spectra of known sources of ingress.

Illustratively, finding an optimum solution to the problem of comparison of the thus-digitized frequency spectrum of the ingress to the frequency spectra of known sources of ingress includes teaching a neural network the frequency spectra of known sources of ingress.

Illustratively, finding an optimum solution to the problem of comparison of the thus-digitized frequency spectrum of the ingress to the frequency spectra of known sources of ingress includes using a back propagation neural network to find an optimum solution to the problem of comparison of the thus-digitized frequency spectrum of the ingress to the frequency spectra of known sources of ingress.

Illustratively, teaching a neural network the frequency spectra of known sources of ingress and using a back propagation neural network to find an optimum solution to the problem of comparison of the thus-digitized frequency spectrum of the ingress to the frequency spectra of known sources of ingress together include using a particle swarm optimizer to find an optimum solution to the problem of comparison of the thus-digitized frequency spectrum of the ingress to the frequency spectra of known sources of ingress.

Illustratively, comparing the frequency spectrum of the ingress to the frequency spectra of known sources of ingress includes digitizing the frequency spectra of known sources of ingress.

Illustratively, comparing the thus-digitized frequency spectrum of the ingress to the thus-digitized frequency spectra of known sources of ingress and determining from the comparison which of the thus-digitized frequency spectra of known sources of ingress is closest to the thus-digitized frequency spectrum of the ingress together include finding an optimum solution to the problem of comparison of the thus-digitized frequency spectrum of the ingress to the thus-digitized frequency spectra of known sources of ingress.

Illustratively, finding an optimum solution to the problem of comparison of the thus-digitized frequency spectrum of the ingress to the thus-digitized frequency spectra of known sources of ingress includes teaching a neural network the thus-digitized frequency spectra of known sources of ingress.

Illustratively, finding an optimum solution to the problem of comparison of the thus-digitized frequency spectrum of the ingress to the thus-digitized frequency spectra of known sources of ingress includes using a back propagation neural network to find an optimum solution to the problem of comparison of the thus-digitized frequency spectrum of the ingress to the thus-digitized frequency spectra of known sources of ingress.

Illustratively, teaching a neural network the thus-digitized frequency spectra of known sources of ingress and using a back propagation neural network to find an optimum solution to the problem of comparison of the thus-digitized frequency spectrum of the ingress to the thus-digitized frequency spectra of known sources of ingress together include using a particle swarm optimizer to find an optimum solution to the problem of comparison of the thus-digitized frequency spectrum of the ingress to the thus-digitized frequency spectra of known sources of ingress.

Illustratively according to this aspect of the invention, comparing the frequency spectrum of the ingress to the frequency spectra of known sources of ingress includes digitizing the frequency spectra of known sources of ingress.

Further illustratively according to this aspect of the invention, comparing the frequency spectrum of the ingress to the thus-digitized frequency spectra of known sources of ingress and determining from the comparison which thus-digitized frequency spectrum of a known source of ingress is closest to the frequency spectrum of the ingress together include finding an optimum solution to the problem of comparison of the frequency spectrum of the ingress to the thus-digitized frequency spectra of known sources of ingress.

Illustratively, finding an optimum solution to the problem of comparison of the frequency spectrum of the ingress to the thus-digitized frequency spectra of known sources of ingress includes teaching a neural network the thus-digitized frequency spectra of known sources of ingress.

Illustratively, finding an optimum solution to the problem of comparison of the frequency spectrum of the ingress to the thus-digitized frequency spectra of known sources of ingress includes using a back propagation neural network to find an optimum solution to the problem of comparison of the frequency spectrum of the ingress to the thus-digitized frequency spectra of known sources of ingress.

Illustratively, teaching a neural network the thus-digitized frequency spectra of known sources of ingress and using a back propagation neural network to find an optimum solution to the problem of comparison of the frequency spectrum of the ingress to the thus-digitized frequency spectra of known sources of ingress together include using a particle swarm optimizer to find an optimum solution to the problem of comparison of the frequency spectrum of the ingress to the thus-digitized frequency spectra of known sources of ingress.

According to another aspect of the invention, an apparatus for identifying a source of ingress into a network includes memory for storing frequency spectra of known sources of ingress and a device for comparing the frequency spectrum of the ingress to frequency spectra of known sources of ingress and determining from the comparison which frequency spectrum of a known source of ingress is closest to the frequency spectrum of the ingress.

Illustratively according to this aspect of the invention, the device includes a device for finding an optimum solution to the problem of comparison of the frequency spectrum of the ingress to the frequency spectra of known sources of ingress.

Further illustratively according to this aspect of the invention, the device includes a neural network. The device teaches the neural network the frequency spectra of known sources of ingress.

Illustratively, the device includes a back propagation neural network for finding an optimum solution to the problem of comparison of the frequency spectrum of the ingress to the frequency spectra of known sources of ingress.

Illustratively, the device further includes a back propagation neural network to find an optimum solution to the problem of comparison of the frequency spectrum of the ingress to the frequency spectra of known sources of ingress. The neural network and back propagation neural network together include a particle swarm optimizer for finding an optimum solution to the problem of comparison of the frequency spectrum of the ingress to the frequency spectra of known sources of ingress.

Illustratively according to this aspect of the invention, the device includes a device for digitizing the frequency spectrum of the ingress.

Further illustratively according to this aspect of the invention, the device includes a device for finding an optimum solution to the problem of comparison of the thus-digitized frequency spectrum of the ingress to the frequency spectra of known sources of ingress.

Illustratively, the device includes a back propagation neural network for finding an optimum solution to the problem of comparison of the thus-digitized frequency spectrum of the ingress to the frequency spectra of known sources of ingress.

Illustratively, the neural network and back propagation neural network together include a particle swarm optimizer for finding an optimum solution to the problem of comparison of the thus-digitized frequency spectrum of the ingress to the frequency spectra of known sources of ingress.

Illustratively, the device includes a device for digitizing the frequency spectra of known sources of ingress. The memory includes a memory for storing the thus-digitized frequency spectra of known sources of ingress.

Illustratively, the device includes a device for finding an optimum solution to the problem of comparison of the thus-digitized frequency spectrum of the ingress to the thus-digitized frequency spectra of known sources of ingress.

Illustratively, the device includes a neural network. The device teaches the neural network the thus-digitized frequency spectra of known sources of ingress.

Illustratively, the device further includes a back propagation neural network for finding an optimum solution to the problem of comparison of the thus-digitized frequency spectrum of the ingress to the thus-digitized frequency spectra of known sources of ingress.

Illustratively, the neural network and back propagation neural network together include a particle swarm optimizer for finding an optimum solution to the problem of comparison of the thus-digitized frequency spectrum of the ingress to the thus-digitized frequency spectra of known sources of ingress.

Further illustratively according to this aspect of the invention, the device includes a device for finding an optimum solution to the problem of comparison of the stored frequency spectrum of the ingress to the thus-digitized frequency spectra of known sources of ingress.

Illustratively, the device includes a back propagation neural network for finding an optimum solution to the problem of comparison of the frequency spectrum of the ingress to the thus-digitized frequency spectra of known sources of ingress.

Illustratively, the neural network and the back propagation neural network together include a particle swarm optimizer for finding an optimum solution to the problem of comparison of the frequency spectrum of the ingress to the thus-digitized frequency spectra of known sources of ingress.

According to another aspect of the invention, a method of establishing ingress into a network includes developing a first frequency spectrum indicative of the condition of the network at a first time during the operation of the network, developing a second frequency spectrum indicative of the condition of the network at a second, later time, comparing the second frequency spectrum to the first frequency spectrum, and determining from the comparison a condition of the network at the second time.

Illustratively according to this aspect of the invention, the at least one first frequency spectrum indicative of the condition of the network at a first time during the operation of the network includes multiple first frequency spectra indicative of the condition of the network at multiple first times during the operation of the network, and the multiple first frequency spectra are combined prior to comparing the second frequency spectrum to the combined first frequency spectra.

Further illustratively according to this aspect of the invention, the first frequency spectrum or the combined first frequency spectra indicative of the condition of the network at multiple first times during the operation of the network include a first frequency spectrum or combined first frequency spectra indicative of a baseline condition of the network.

Additionally illustratively according to this aspect of the invention, comparing the second frequency spectrum to the first frequency spectrum or combined first frequency spectra and determining from the comparison the condition of the network at the second time together include finding an optimum solution to the problem of comparison of the second frequency spectrum to the first frequency spectrum or combined first frequency spectra.

Illustratively according to this aspect of the invention, finding an optimum solution to the problem of comparison of the second frequency spectrum to the first frequency spectrum or combined first frequency spectra includes teaching a neural network the first frequency spectrum or combined first frequency spectra.

Further illustratively according to this aspect of the invention, finding an optimum solution to the problem of comparison of the second frequency spectrum to the first frequency spectrum or combined first frequency spectra includes using a back propagation neural network to find an optimum solution to the problem of comparison of the second frequency spectrum to the first frequency spectrum or combined first frequency spectra.

Additionally illustratively according to this aspect of the invention, teaching a neural network the first frequency spectrum or combined first frequency spectra and using a back propagation neural network to find an optimum solution to the problem of comparison of the second frequency spectrum to the first frequency spectrum or combined first frequency spectra together include using a particle swarm optimizer to find an optimum solution to the problem of comparison of the second frequency spectrum to the first frequency spectrum or combined first frequency spectra.

Illustratively according to this aspect of the invention, one or the other or both of the first and second frequency spectra are digitized at some point during the method.

According to yet another aspect of the invention, apparatus for establishing ingress into a network includes a device for receiving frequency spectra. The device receives at least one first frequency spectrum indicative of the condition of the network at a first time during the operation of the network, receives a second frequency spectrum indicative of the condition of the network at a second, later time, compares the second frequency spectrum to the first frequency spectrum, and determines from the comparison the condition of the network at the second time.

Illustratively according to this aspect of the invention, the at least one first frequency spectrum indicative of the condition of the network at a first time during the operation of the network includes multiple first frequency spectra indicative of the condition of the network at multiple first times during the operation of the network. The device combines the multiple first frequency spectra prior to comparing the second frequency spectrum to the combined first frequency spectra.

Further illustratively according to this aspect of the invention, the first frequency spectrum or the combined first frequency spectra indicative of the condition of the network at multiple first times during the operation of the network include a first frequency spectrum or combined first frequency spectra indicative of a baseline condition of the network.

Additionally illustratively according to this aspect of the invention, the device for comparing the second frequency spectrum to the first frequency spectrum or combined first frequency spectra and determining from the comparison the condition of the network at the second time together include a device for finding an optimum solution to the problem of comparison of the second frequency spectrum to the first frequency spectrum or combined first frequency spectra.

Illustratively according to this aspect of the invention, the device for finding an optimum solution to the problem of comparison of the second frequency spectrum to the first frequency spectrum or combined first frequency spectra includes a device for teaching a neural network the first frequency spectrum or combined first frequency spectra.

Further illustratively according to this aspect of the invention, the device for finding an optimum solution to the problem of comparison of the second frequency spectrum to the first frequency spectrum or combined first frequency spectra includes a device for using a back propagation neural network to find an optimum solution to the problem of comparison of the second frequency spectrum to the first frequency spectrum or combined first frequency spectra.

Additionally illustratively according to this aspect of the invention, the device for teaching a neural network the first frequency spectrum or combined first frequency spectra and using a back propagation neural network to find an optimum solution to the problem of comparison of the second frequency spectrum to the first frequency spectrum or combined first frequency spectra together include a device for using a particle swarm optimizer to find an optimum solution to the problem of comparison of the second frequency spectrum to the first frequency spectrum or combined first frequency spectra.

Illustratively according to this aspect of the invention, the device includes a device for digitizing one or the other or both of the first and second frequency spectra at some point during the processing of the one or the other or both of the first and second frequency spectra.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
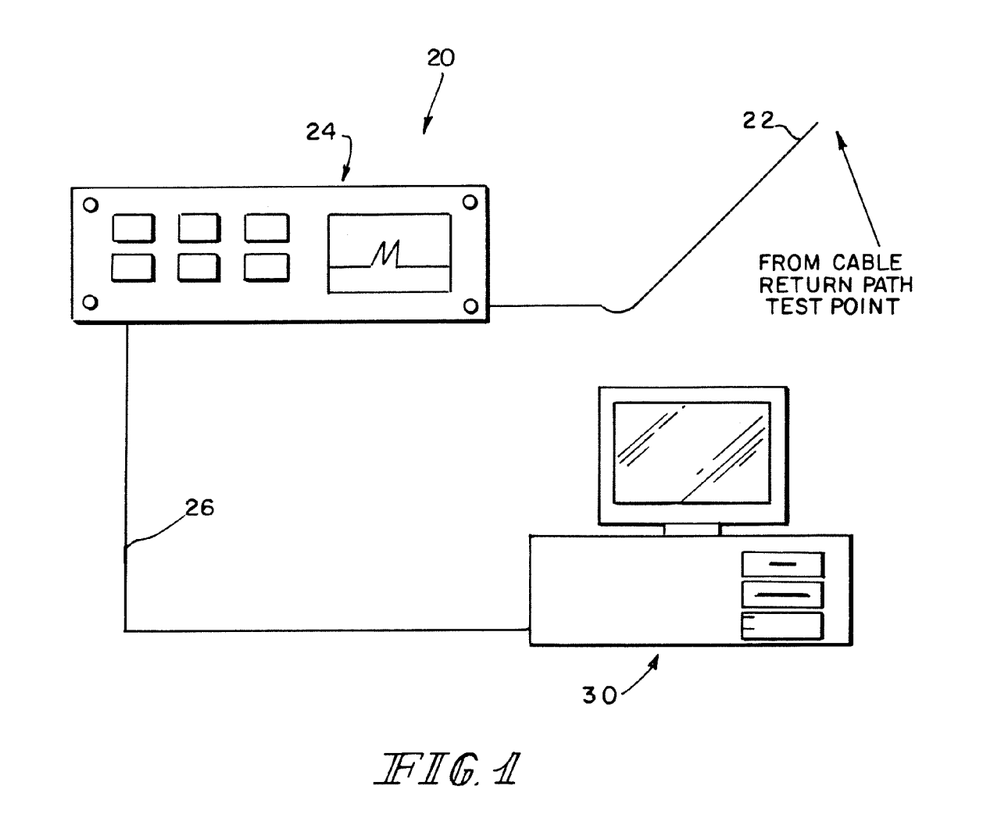
FIG. 1 illustrates a diagram of hardware for implementing a system according to the present invention.
Figure 2:
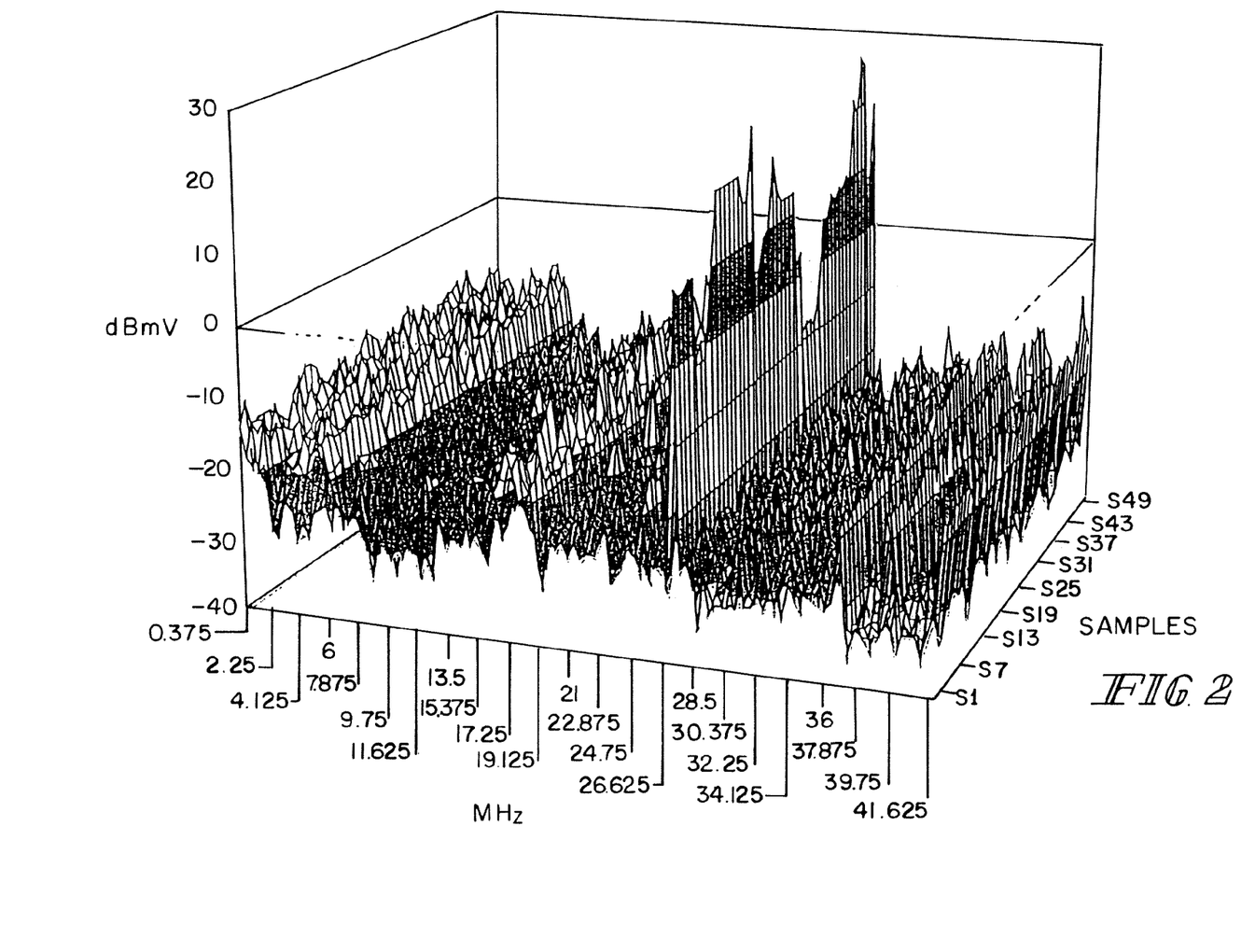
FIGS. 2-5 illustrate graphs useful in understanding the present invention; and, FIG. 6 illustrates a diagram useful in understanding the present invention.
Figure 3:
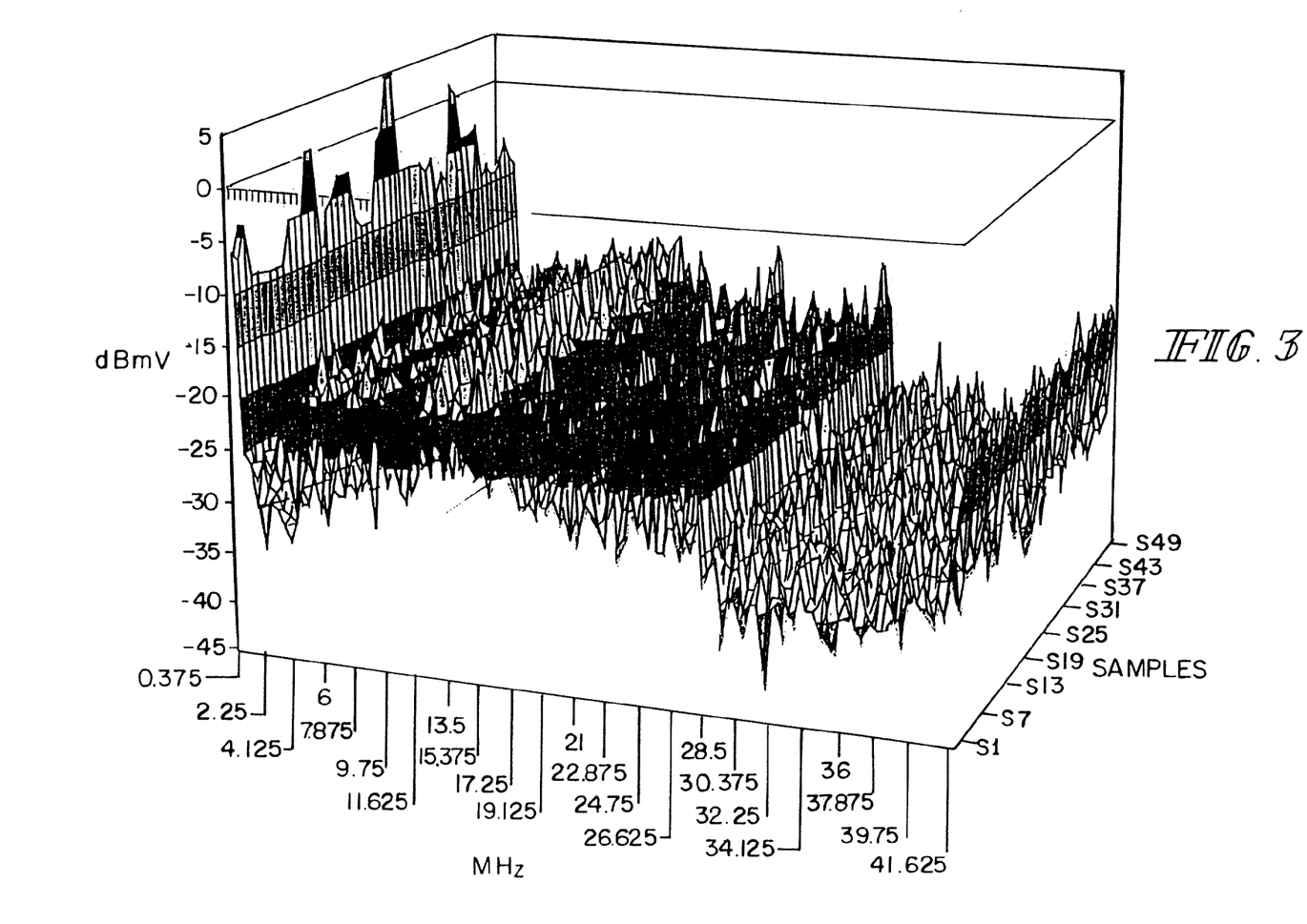
Figure 4:
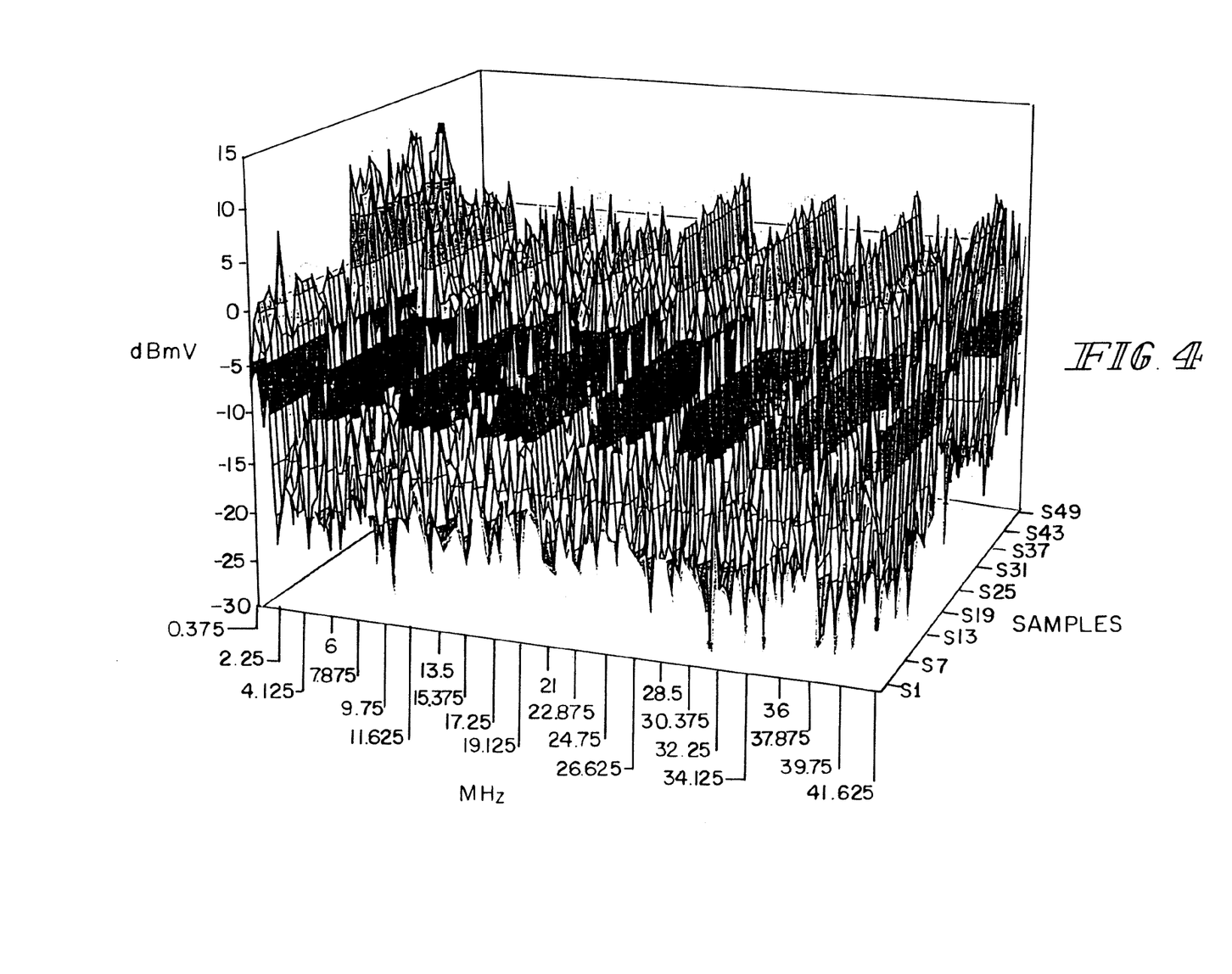
Figure 5:
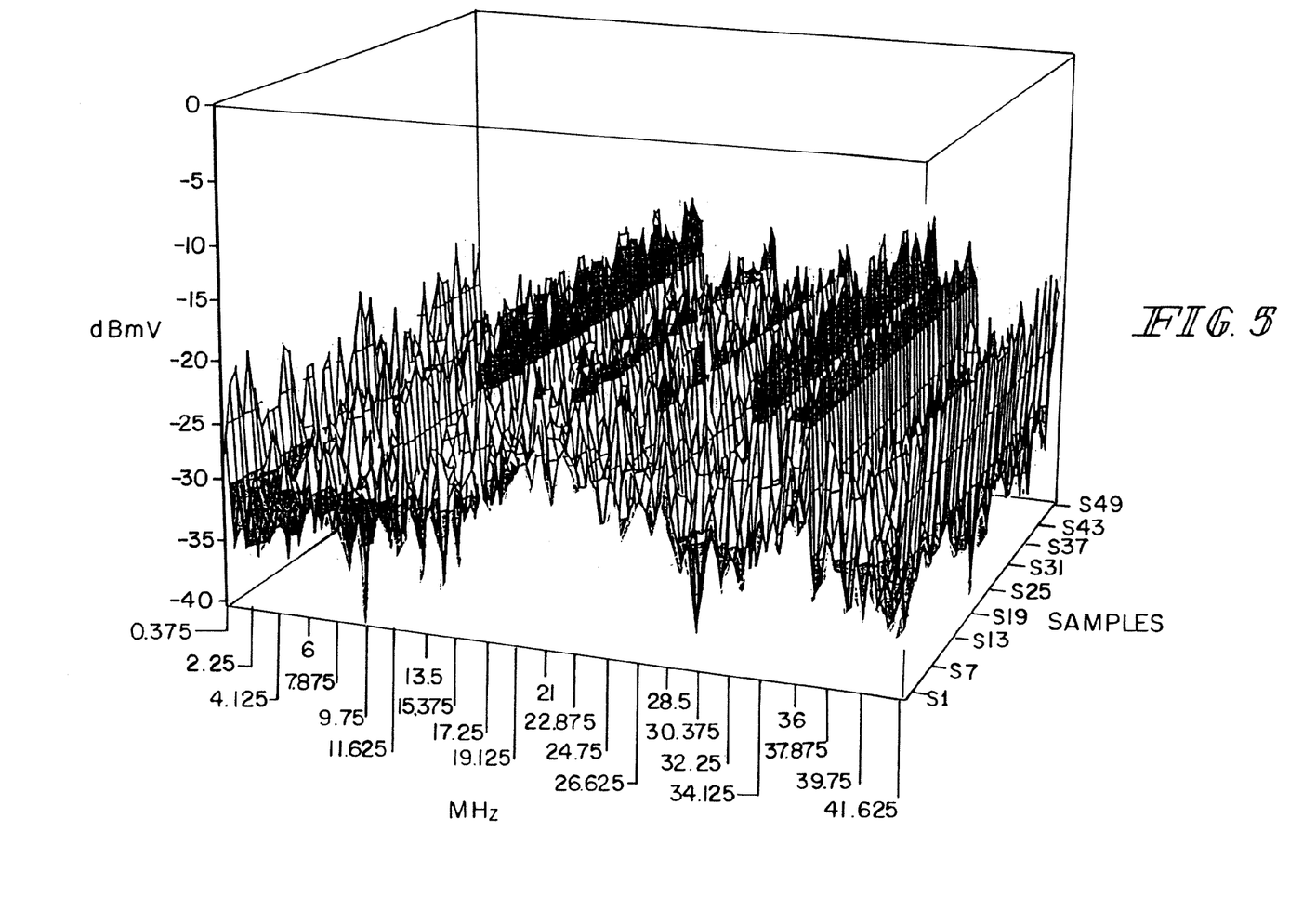

Referring now to FIG. 1, a hardware and data capture system 20 constructed according to the invention is illustrated. RF information is coupled from a cable return path test point 22 directly to a return path spectrum analyzer 24 such as, for example, the model SST-9580 return path spectrum analyzer available from Trilithic, Inc., 9202 East 33rd Street, Indianapolis, Ind. 46236. This particular analyzer 24 filters out all frequencies above 42 MHz and examines all information from 375 KHz to 42 MHz. This entire bandwidth is processed with a digital signal processor in analyzer 24. The resulting data is then formatted for transmission by a secondary microprocessor in analyzer 24. The data can be recovered from, for example, an adjustable RF telemetry carrier, from a PC compatible RS-232C data link 26, or an ethernet link.

The data is recovered and saved using an IBM compatible 486, 66 MHz or faster PC 30 running Windows® 3.1, or later version, software. Also required are Trilithic SST Ingress Manager data collection and warning system software, or equivalent, Trilithic SST File Translator binary-to-spreadsheet converter software, or equivalent, and Microsoft® Excel® spreadsheet software, or equivalent. The data is displayed graphically as well as being saved in a binary format to the PC 30's hard disk. Each record is approximately 2 Kbytes in size and contains the entire spectrum of the source, as well as additional data related to the spectrum. The spectrum data will be parsed out into a spreadsheet compatible format. The spreadsheet can then do all of the data formatting for neural network processing.

In the illustrated embodiment of the invention, data to capture includes CB signals, AM radio, common path distortion and clean systems, that is, systems which do not display CB signal, AM radio, or common path distortion. The ingress manager software captures 50 samples of each type of disturbance, and writes the 50 samples of each to its respective file: CB_50.5ST, AM_50.5ST, CP_50.5ST, and NOISE_50.5ST. Illustrative sample displays are shown in FIGS. 2-5, respectively. The spectral data is saved in a 112 byte binary format, +70 dBmV to −40 dBmV in one dBmV increments, and 375 KHz to 42 MHz in 375 KHz increments. The data ultimately is converted to a text based 0 to 1 ranged format for the following neural network algorithms. The data is first converted from binary to ASCII. As noted above, Trilithic SST File Translator binary-to-spreadsheet converter software, or equivalent, may be used to convert each of the above-mentioned CB_50.SST, AM_50.SST, CP_50.SST, and NOISE_50.SST files to a comma delimited ASCII format which can then be imported into the Microsoft® Excel® spreadsheet software, or equivalent. The data is then mapped from (+30 to −40) to (1 to 0) for particle swarm and back propagation algorithm compatibility. These algorithms are described later. A useful equation for linear mapping is:

New=0.0143*Old+0.5714.

The data samples are then appended for input into a neural network. This modification is required because the neural network algorithms used herein require specific output class definitions for structured supervised learning. This means that data input versus output patterns are presented to the network until an acceptable error is achieved. Four output classes are defined. A clean system is defined by the class 1000. CB interference is defined by the class 0100. Common path distortion is defined by the class 0010. AM radio interference is defined by the class 0001. 160 samples, or 80% of the 4×50 samples total, will be used to train the neural network, with 40 samples randomly selected from each data set. The remaining 40 samples, 10 randomly selected from each data set, are reserved for testing the neural network. Data are alternated: clean; CB; common path distortion; and AM, and repeated. This is done to permit the particle swarm algorithm to converge more quickly. It is believed that this reduces the likelihood that the particle swarm algorithm will identify a local optimum.

A particle swarm optimizer is an algorithm designed to fly a population of "particles," or potential solutions to an optimization problem, through a solution space in search of an optimal solution to the problem. It may be analogized to a flock of birds flying in search of food. When a bird in the flock gets close enough to what appears to be food to identify it as food, the entire flock changes course. This continues until food is located. The particle swarm optimizer which was implemented in the illustrative embodiment was designed to search a solution space for the optimal weights for a back propagation neural network. The algorithm provided with RUSS EBERHART ET AL., COMPUTATIONAL INTELLIGENCE PC TOOLS, 1996 was converted from a DOS-based application (64K or 1M limited) to run under Windows® software, and had its memory allocation functions enhanced and its graphic functions deleted. The new source code, AISI.C is submitted herewith. This permits the program to use the extensive virtual memory of Windows® software, and to execute quickly without graphics overhead.

Figure 6:
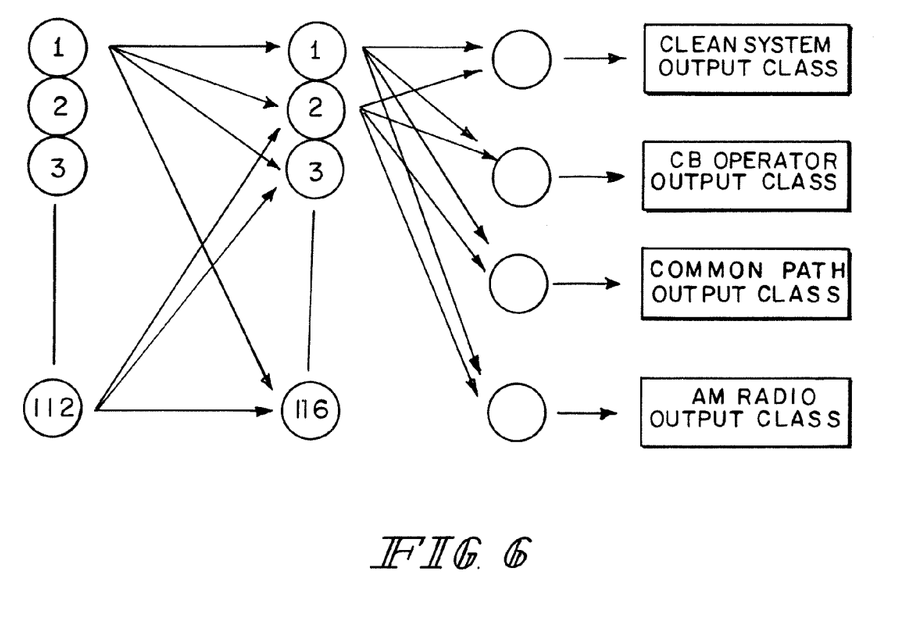

The back propagation neural network implemented in the illustrative embodiment comprises a three-layer, fully interconnected, feed forward, biased network. With reference to FIG. 6, the circles indicate nodes of the illustrative back propagation neural network and the arrows indicate node connection weights. It is evident that not all nodes and not all connections are illustrated.

The training data was input into a particle swarm optimizer designed to output the weights of a back propagation neural network. The particle swarm optimizer used 112 input processing elements, 116 hidden processing elements and 4 output processing elements. The 112 input processing elements represent the 112 bytes of spectral data. The four output processing elements represent the four classes of spectra: clean; CB noise; common path distortion; and, AM radio noise. The number of hidden processing elements was determined by squaring the number of input processing elements, squaring the number of output processing elements, adding these two squares, and taking the square root. This figure was slightly greater than 112. A few extra processing units were added for processing safety, yielding the 116 figure.

The particle swarm optimizer was run in the global mode with a small number of particles, for example, 10 to 15, due to the mass of input data. This permitted the entire population to be examined for optimum solutions, rather than a small neighborhood of particles. This method yielded a training time reduction. An acceptable training sum-squared error of 0.02 and an acceptable test identification accuracy of 95% were sought. Both of these objectives were exceeded using the particle swarm optimizer run file AISI.RUN, which is submitted herewith.

The particle swarm optimizer was run a total of 6 times and all runs converged with an error less than 0.02. Most of the training runs were completed in about 10 hours of processing time on an IBM compatible 486, 66 MHz PC 30. The output file from the particle swarm optimizer, which is the weights of the back propagation network, was input and run using the back propagation algorithm supplied in COMPUTATIONAL INTELLIGENCE PC TOOLS, supra. Within seconds, the algorithm produced and output the classification file which is submitted herewith. The *RUN, *NET, *WTS, and various other required back propagation files are submitted herewith. Several of the weight files produced by the particle swarm optimizer were tested and all produced similar results.

In other embodiments of the invention, return path ingress during periods of acceptable ingress is collected, and (a) profile(s) of the ingress noise spectrum is (are) developed. A single profile may be developed, or multiple profiles may be developed for different times during the day, such as hourly, or by weekday, Saturday and Sunday, or by week or month of the year, and so on. These profiles may be the result of a single data collection in a period during which return path performance is acceptable, or may be the results of averaging over several data collection periods. The profile(s) may be cumulative, being updated, for example, periodically, with current information. In any event, the return path spectrum at any time can be processed according to the method against the collected return path spectral data using a neural net to identify times at which ingress is markedly different than the return path spectral data against which it is being compared. This embodiment can be used independently of, or in conjunction with, the first embodiment. This information can thus be used both to determine the overall condition of the system and to isolate locations and sources of ingress noise into the return path.

These methods can be implemented using the identified hardware and software by the cable technician to identify sources of ingress into a cable system to help the cable technician in locating ingress sites and taking corrective action.

The invention claimed is:

1. A method of identifying a source of ingress into a network including storing frequency spectra of known sources of ingress, comparing the frequency spectrum of ingress to the frequency spectra of known sources of ingress, and determining from the comparison which of the frequency spectra of known sources of ingress is closest to the frequency spectrum of the ingress.

2. The method of claim 1 wherein comparing the frequency spectrum of the ingress to the frequency spectra of known sources of ingress and determining from the comparison which of the frequency spectra of known sources of ingress is closest to the frequency spectrum of the ingress together include finding an optimum solution to the problem of comparison of the frequency spectrum of the ingress to the frequency spectra of known sources of ingress.

3. The method of claim 2 wherein finding an optimum solution to the problem of comparison of the frequency spectrum of the ingress to the frequency spectra of known sources of ingress includes teaching a neural network the frequency spectra of known sources of ingress.

4. The method of claim 3 wherein finding an optimum solution to the problem of comparison of the frequency spectrum of the ingress to the frequency spectra of known sources of ingress includes using a back propagation neural network to find an optimum solution to the problem of comparison of the frequency spectrum of the ingress to the frequency spectra of known sources of ingress.

5. The method of claim 4 wherein teaching a neural network the frequency spectra of known sources of ingress and using a back propagation neural network to find an optimum solution to the problem of comparison of the frequency spectrum of the ingress to the frequency spectra of known sources of ingress together include using a particle swarm optimizer to find an optimum solution to the problem of comparison of the frequency spectrum of the ingress to the frequency spectra of known sources of ingress.

6. The method of claim 1 further including digitizing the frequency spectrum of the ingress.

7. The method of claim 6 wherein comparing the thus-digitized frequency spectrum of the ingress to the frequency spectra of known sources of ingress and determining from the comparison which frequency spectrum of a known source of ingress is closest to the thus-digitized frequency spectrum of the ingress together include finding an optimum solution to the problem of comparison of the thus-digitized frequency spectrum of the ingress to the frequency spectra of known sources of ingress.

8. The method of claim 7 wherein finding an optimum solution to the problem of comparison of the thus-digitized frequency spectrum of the ingress to the frequency spectra of known sources of ingress includes teaching a neural network the frequency spectra of known sources of ingress.

9. The method of claim 8 wherein finding an optimum solution to the problem of comparison of the thus-digitized frequency spectrum of the ingress to the frequency spectra of known sources of ingress includes using a back propagation neural network to find an optimum solution to the problem of comparison of the thus-digitized frequency spectrum of the ingress to the frequency spectra of known sources of ingress.

10. The method of claim 9 wherein teaching a neural network the frequency spectra of known sources of ingress and using a back propagation neural network to find an optimum solution to the problem of comparison of the thus-digitized frequency spectrum of the ingress to the frequency spectra of known sources of ingress together include using a particle swarm optimizer to find an optimum solution to the problem of comparison of the thus-digitized frequency spectrum of the ingress to the frequency spectra of known sources of ingress.

11. The method of claim 6 wherein comparing the frequency spectrum of the ingress to the frequency spectra of known sources of ingress includes digitizing the frequency spectra of known sources of ingress.

12. The method of claim 11 wherein comparing the thus-digitized frequency spectrum of the ingress to the thus-digitized frequency spectra of known sources of ingress and determining from the comparison which of the thus-digitized frequency spectra of known sources of ingress is closest to the thus-digitized frequency spectrum of the ingress together include finding an optimum solution to the problem of comparison of the thus-digitized frequency spectrum of the ingress to the thus-digitized frequency spectra of known sources of ingress.

13. The method of claim 12 wherein finding an optimum solution to the problem of comparison of the thus-digitized frequency spectrum of the ingress to the thus-digitized frequency spectra of known sources of ingress includes teaching a neural network the thus-digitized frequency spectra of known sources of ingress.

14. The method of claim 13 wherein finding an optimum solution to the problem of comparison of the thus-digitized frequency spectrum of the ingress to the thus-digitized frequency spectra of known sources of ingress includes using a back propagation neural network to find an optimum solution to the problem of comparison of the thus-digitized frequency spectrum of the ingress to the thus-digitized frequency spectra of known sources of ingress.

15. The method of claim 14 wherein teaching a neural network the thus-digitized frequency spectra of known sources of ingress and using a back propagation neural network to find an optimum solution to the problem of comparison of the thus-digitized frequency spectrum of the ingress to the thus-digitized frequency spectra of known sources of ingress together include using a particle swarm optimizer to find an optimum solution to the problem of comparison of the thus-digitized frequency spectrum of the ingress to the thus-digitized frequency spectra of known sources of ingress.

16. The method of claim 1 wherein comparing the frequency spectrum of the ingress to the frequency spectra of known sources of ingress includes digitizing the frequency spectra of known sources of ingress.

17. The method of claim 16 wherein comparing the frequency spectrum of the ingress to the thus-digitized frequency spectra of known sources of ingress and determining from the comparison which thus-digitized frequency spectrum of a known source of ingress is closest to the frequency spectrum of the ingress together include finding an optimum solution to the problem of comparison of the frequency spectrum of the ingress to the thus-digitized frequency spectra of known sources of ingress.

18. The method of claim 17 wherein finding an optimum solution to the problem of comparison of the frequency spectrum of the ingress to the thus-digitized frequency spectra of known sources of ingress includes teaching a neural network the thus-digitized frequency spectra of known sources of ingress.

19. The method of claim 18 wherein finding an optimum solution to the problem of comparison of the frequency spectrum of the ingress to the thus-digitized frequency spectra of known sources of ingress includes using a back propagation neural network to find an optimum solution to the problem of comparison of the frequency spectrum of the ingress to the thus-digitized frequency spectra of known sources of ingress.

20. The method of claim 19 wherein teaching a neural network the thus-digitized frequency spectra of known sources of ingress and using a back propagation neural network to find an optimum solution to the problem of comparison of the frequency spectrum of the ingress to the thus-digitized frequency spectra of known sources of ingress together include using a particle swarm optimizer to find an optimum solution to the problem of comparison of the frequency spectrum of the ingress to the thus-digitized frequency spectra of known sources of ingress.

21. Apparatus for identifying a source of ingress into a network including memory for storing frequency spectra of known sources of ingress and a device for comparing the frequency spectrum of the ingress to frequency spectra of known sources of ingress and determining from the comparison which frequency spectrum of a known source of ingress is closest to the frequency spectrum of the ingress.

22. The apparatus of claim 21 wherein the device includes a device for finding an optimum solution to the problem of comparison of the frequency spectrum of the ingress to the frequency spectra of known sources of ingress.

23. The apparatus of claim 22 wherein the device includes a neural network, the device teaching the neural network the frequency spectra of known sources of ingress.

24. The apparatus of claim 23 wherein the device includes a back propagation neural network for finding an optimum solution to the problem of comparison of the frequency spectrum of the ingress to the frequency spectra of known sources of ingress.

25. The apparatus of claim 24 wherein the device further includes a back propagation neural network to find an optimum solution to the problem of comparison of the frequency spectrum of the ingress to the frequency spectra of known sources of ingress, the neural network and back propagation neural network together including a particle swarm optimizer for finding an optimum solution to the problem of comparison of the frequency spectrum of the ingress to the frequency spectra of known sources of ingress.

26. The apparatus of claim 21 wherein the device includes a device for digitizing the frequency spectrum of the ingress.

27. The apparatus of claim 26 wherein the device includes a device for finding an optimum solution to the problem of comparison of the thus-digitized frequency spectrum of the ingress to the frequency spectra of known sources of ingress.

28. The apparatus of claim 27 wherein the device includes a neural network, the device teaching the neural network the frequency spectra of known sources of ingress.

29. The apparatus of claim 28 wherein the device includes a back propagation neural network for finding an optimum solution to the problem of comparison of the thus-digitized frequency spectrum of the ingress to the frequency spectra of known sources of ingress.

30. The apparatus of claim 29 wherein the neural network and back propagation neural network together include a particle swarm optimizer for finding an optimum solution to the problem of comparison of the thus-digitized frequency spectrum of the ingress to the frequency spectra of known sources of ingress.

31. The apparatus of claim 26 wherein the device includes a device for digitizing the frequency spectra of known sources of ingress and the memory includes a memory for storing the thus-digitized frequency spectra of known sources of ingress.

32. The apparatus of claim 31 wherein the device includes a device for finding an optimum solution to the problem of comparison of the thus-digitized frequency spectrum of the ingress to the thus-digitized frequency spectra of known sources of ingress.

33. The apparatus of claim 32 wherein the device includes a neural network, the device teaching the neural network the thus-digitized frequency spectra of known sources of ingress.

34. The apparatus of claim 33 wherein the device further includes a back propagation neural network for finding an optimum solution to the problem of comparison of the thus-digitized frequency spectrum of the ingress to the thus-digitized frequency spectra of known sources of ingress.

35. The apparatus of claim 34 wherein the neural network and back propagation neural network together include a particle swarm optimizer for finding an optimum solution to the problem of comparison of the thus-digitized frequency spectrum of the ingress to the thus-digitized frequency spectra of known sources of ingress.

36. The apparatus of claim 21 wherein the device includes a device for digitizing the frequency spectra of known sources of ingress and the memory includes a memory for storing the thus-digitized frequency spectra of known sources of ingress.

37. The apparatus of claim 36 wherein the device includes a device for finding an optimum solution to the problem of comparison of the stored frequency spectrum of the ingress to the thus-digitized frequency spectra of known sources of ingress.

38. The apparatus of claim 37 wherein the device includes a neural network, the device teaching the neural network the thus-digitized frequency spectra of known sources of ingress.

39. The apparatus of claim 38 further including a back propagation neural network for finding an optimum solution to the problem of comparison of the frequency spectrum of the ingress to the thus-digitized frequency spectra of known sources of ingress.

40. The apparatus of claim 39 wherein the neural network and the back propagation neural network together include a particle swarm optimizer for finding an optimum solution to the problem of comparison of the frequency spectrum of the ingress to the thus-digitized frequency spectra of known sources of ingress.

* * * * *

UNITED STATES PATENT AND TRADEMARK OFFICE
CERTIFICATE OF CORRECTION

PATENT NO. : 7,620,611 B1  
APPLICATION NO. : 09/618615  
DATED : November 17, 2009  
INVENTOR(S) : Gary W. Sinde Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2914 days.

Signed and Sealed this

Twenty-sixth Day of October, 2010

David J. Kappos  
*Director of the United States Patent and Trademark Office*